(12) United States Patent
Omori et al.

(10) Patent No.: US 11,979,079 B2
(45) Date of Patent: May 7, 2024

(54) ELECTRIC MOTOR COOLING STRUCTURE

(71) Applicant: HONDA MOTOR CO., LTD., Tokyo (JP)

(72) Inventors: Kohei Omori, Asaka (JP); Hiroyuki Sugiura, Asaka (JP); Yuki Nagata, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 406 days.

(21) Appl. No.: 17/170,188

(22) Filed: Feb. 8, 2021

(65) Prior Publication Data

US 2021/0265896 A1 Aug. 26, 2021

(30) Foreign Application Priority Data

Feb. 26, 2020 (JP) ................................. 2020-030340

(51) Int. Cl.
| | |
|---|---|
| *H02K 9/00* | (2006.01) |
| *H02K 5/00* | (2006.01) |
| *H02K 5/20* | (2006.01) |
| *H02K 9/19* | (2006.01) |

(52) U.S. Cl.
CPC ............... *H02K 9/19* (2013.01); *H02K 5/203* (2021.01)

(58) Field of Classification Search
CPC ............ H02K 9/19; H02K 5/203; H02K 5/00; H02K 5/02; H02K 5/08; H02K 5/20; H02K 9/00
See application file for complete search history.

(56) References Cited

U.S. PATENT DOCUMENTS

| | | | |
|---|---|---|---|
| 10,408,115 B2 | 9/2019 | Okada et al. | |
| 10,439,476 B2 | 10/2019 | Tsuchie | |
| 2007/0062467 A1* | 3/2007 | Tanaka | F01M 11/02 |
| | | | 123/41.31 |
| 2010/0045125 A1* | 2/2010 | Takenaka | H02K 9/19 |
| | | | 310/54 |

(Continued)

FOREIGN PATENT DOCUMENTS

| | | |
|---|---|---|
| JP | 2014-096876 A | 5/2014 |
| JP | 2018-057112 A | 4/2018 |

OTHER PUBLICATIONS

Office Action dated Sep. 15, 2021 issued over the corresponding Japanese Patent Application No. 2020-030340 with the English translation thereof.

*Primary Examiner* — Tran N Nguyen
(74) *Attorney, Agent, or Firm* — Carrier, Shende & Associates, P.C.; Joseph P. Carrier; Fulchand P. Shende (57) ABSTRACT

In an electric motor cooling structure for cooling an electric motor provided in a power unit by jetting an oil to the electric motor, an oil passage for passing the oil therethrough is formed between a cover member covering the electric motor from outside and a lid member fitted to the cover member. The cover member is formed with a plurality of jet holes as through-holes communicating with the oil passage, and the plurality of jet holes are oriented in the same direction as an axial direction of the motor. The oil passage is formed in an annular shape as viewed in the axial direction of the electric motor. The cover member is formed with a second oil passage for supplying the oil to a rotary shaft of the electric motor. Such cooling structure efficiently cools the electric motor while suppressing processing cost with a simple oil passage structure.

13 Claims, 12 Drawing Sheets

(56) References Cited

U.S. PATENT DOCUMENTS

| | | | |
|---|---|---|---|
| 2013/0169073 A1* | 7/2013 | Nagahama | H02K 11/0141 310/43 |
| 2014/0023484 A1* | 1/2014 | Watanabe | H02K 5/203 415/116 |
| 2014/0097712 A1* | 4/2014 | Kozaka | H02K 1/32 310/52 |
| 2014/0125162 A1* | 5/2014 | Tsuchie | H02K 9/193 310/54 |

* cited by examiner

ELECTRIC MOTOR COOLING STRUCTURE

TECHNICAL FIELD

The present invention relates to an electric motor cooling structure, particularly to an electric motor cooling structure capable of jetting an engine oil to an electric motor.

BACKGROUND ART

Conventionally, an electric motor cooling structure has been known in which an engine oil is jetted to an electric motor rotated synchronously with a crankshaft of an engine for cooling the electric motor.

Patent Document 1 discloses a generator cooling structure, in connection with a generator as an outer rotor type electric motor attached to a vehicle width-directionally outer side of a crankcase of an engine, in which a cover member covering the vehicle width-directionally outer sides of the generator is formed with an oil passage for sending an engine oil under pressure and with a plurality of jet holes, and the engine oil is jetted toward the generator from the vehicle width-directionally outer side.

PRIOR ART DOCUMENT

Patent Document

Patent Document 1: JP 2018-57112A

SUMMARY OF INVENTION

Problems to be Solved by Invention

However, the generator cooling structure disclosed in Patent Document 1 is configured such that the oil is jetted to a part of the generator by three jet holes, and there is still room for contrivance as to further enhancement of the cooling effect and simplification of oil passages.

It is an object of the present invention to provide an electric motor cooling structure by which the problem in the conventional technique can be solved and an electric motor can be efficiently cooled while suppressing processing cost with a simple oil passage structure.

Means for Solving Problems

To achieve the afore-mentioned object, the present invention has a first feature in that an electric motor cooling structure for cooling an electric motor (M) provided in a power unit (P) by jetting an oil (O) to the electric motor (M), wherein an oil passage (48) for passing the oil (O) is formed between a cover member (40) covering the electric motor (M) from outside and a lid member (50) fitted to the cover member (40), the cover member (40) is formed with a plurality of jet holes (60) as through-holes communicating with the oil passage (48), and the plurality of jet holes (60) are oriented in a same direction as an axial direction of the electric motor (M).

The present invention has a second feature in that the oil passage (48) is formed in an annular shape as viewed in the axial direction of the electric motor (M).

The present invention has a third feature in that the cover member (40) is formed with a second oil passage (45a) for supplying the oil (O) to a rotary shaft (53) of the electric motor (M).

The present invention has a fourth feature in that a wall section of the cover member (40) on a discharge side of the jet holes (60) is formed with enlarged-diameter recesses (62) concentric with the jet holes (60).

The present invention has a fifth feature in that a wall section of the cover member (40) on a suction side of the jet holes (60) is formed with second enlarged-diameter recesses (63) concentric with the jet holes (60).

The present invention has a sixth feature in that a sectional area of the oil passage (48) is greater than a total value of sectional areas of the plurality of jet holes (60).

The present invention has a seventh feature in that an electric oil cooling structure for cooling an electric motor (M) provided in a power unit (P) by jetting an oil (O) to the electric motor (M), wherein an oil passage (151) for passing the oil (O) is formed between a cover member (150) covering the electric motor (M) from outside and a lid member (100) fitted to the cover member (150), the cover member (150) is formed with a plurality of jet holes (160) as through-holes communicating with the oil passage (151), the plurality of jet holes (160) are oriented in a same direction as an axial direction of the electric motor (M), the cover member (150) is formed with a second oil passage (156) for supplying the oil (O) to one end side of a rotary shaft (190) of the rotary shaft (190) of the electric motor (M), the lid member (100) is formed with a cylindrical section (102) extending toward one end portion of the rotary shaft (190), a side wall of the cylindrical section (102) is formed with an opening (104) for communicating with the second oil passage (156), an oil seal (172) is disposed between the cylindrical section (102) and the one end portion of the rotary shaft (190), and the lid member (100) is attached to the cover member (150), whereby a space inside the cylindrical section (102) functions as an oil reservoir section for supplying the oil (O) to the rotary shaft (190).

Effect of Invention

According to the first feature in that an electric motor cooling structure for cooling an electric motor (M) provided in a power unit (P) by jetting an oil (O) to the electric motor (M), wherein an oil passage (48) for passing the oil (O) is formed between a cover member (40) covering the electric motor (M) from outside and a lid member (50) fitted to the cover member (40), the cover member (40) is formed with a plurality of jet holes (60) as through-holes communicating with the oil passage (48), and the plurality of jet holes (60) are oriented in a same direction as an axial direction of the electric motor (M), with the oil passage provided between the cover member and the lid member, the oil passage can be formed with a simple structure. In addition, with the jet holes oriented in the same direction as the axial direction of the electric motor, the operation of forming the jet holes by a drill is facilitated, as compared, for example, to the case where the jet holes are inclined relative to the axial direction of the electric motor. Specifically, at the time of forming the cover member with the plurality of jet holes by a drill, the processing can be performed by only changing the boring position while keeping the cover member fixed, and it is possible to enhance operation efficiency and processing accuracy.

According to the second feature in that the oil passage (48) is formed in an annular shape as viewed in the axial direction of the electric motor (M), the jet holes corresponding to the stator coils of the electric motor which are arranged at regular intervals in an annular pattern can be easily provided.

According to the third feature in that the cover member (40) is formed with a second oil passage (45a) for supplying the oil (O) to a rotary shaft (53) of the electric motor (M), with the oil passage for cooling the electric motor and the second oil passage for lubricating the rotary shaft of the electric motor formed separately and independently, it is possible to supply the respective oil passages with the oil at a stable pressure.

According to the fourth feature in that a wall section of the cover member (40) on a discharge side of the jet holes (60) is formed with enlarged-diameter recesses (62) concentric with the jet holes (60), by forming the enlarged-diameter recesses by a large-diameter drill and thereafter forming the through-holes in bottom portions of the enlarged-diameter recesses by a small-diameter drill, the thickness required to be penetrated by the small-diameter drill can be reduced, and burden on the small-diameter drill can be reduced.

According to the fifth feature in that a wall section of the cover member (40) on a suction side of the jet holes (60) is formed with second enlarged-diameter recesses (63) concentric with the jet holes (60), the oil can be reserved in the recesses, and the supply of the oil to the through-holes can be more stabilized.

According to the sixth feature in that a sectional area of the oil passage (48) is greater than a total value of sectional areas of the plurality of jet holes (60), it is possible to maintain the pressure in the oil passage and to enhance a cooling effect on the electric motor.

According to the seventh feature in that an electric oil cooling structure for cooling an electric motor (M) provided in a power unit (P) by jetting an oil (O) to the electric motor (M), wherein an oil passage (151) for passing the oil (O) is formed between a cover member (150) covering the electric motor (M) from outside and a lid member (100) fitted to the cover member (150), the cover member (150) is formed with a plurality of jet holes (160) as through-holes communicating with the oil passage (151), the plurality of jet holes (160) are oriented in a same direction as an axial direction of the electric motor (M), the cover member (150) is formed with a second oil passage (156) for supplying the oil (O) to one end side of a rotary shaft (190) of the rotary shaft (190) of the electric motor (M), the lid member (100) is formed with a cylindrical section (102) extending toward one end portion of the rotary shaft (190), a side wall of the cylindrical section (102) is formed with an opening (104) for communicating with the second oil passage (156), an oil seal (172) is disposed between the cylindrical section (102) and the one end portion of the rotary shaft (190), and the lid member (100) is attached to the cover member (150), whereby a space inside the cylindrical section (102) functions as an oil reservoir section for supplying the oil (O) to the rotary shaft (190), with the lid member provided with the cylindrical section, the lid member can be fixed to the cover member accurately. In addition, the oil seal can be pressurized by attaching the lid member to the cover member, and the oil reservoir section can be provided without increasing the number of component parts. Further, since the oil passage for cooling the electric motor and the oil reservoir section for lubricating the rotary shaft can be disposed such as to overlap with each other in the axial direction, the size in the axial direction of the cover member can be reduced.

DESCRIPTION OF EMBODIMENTS

Figure 1:
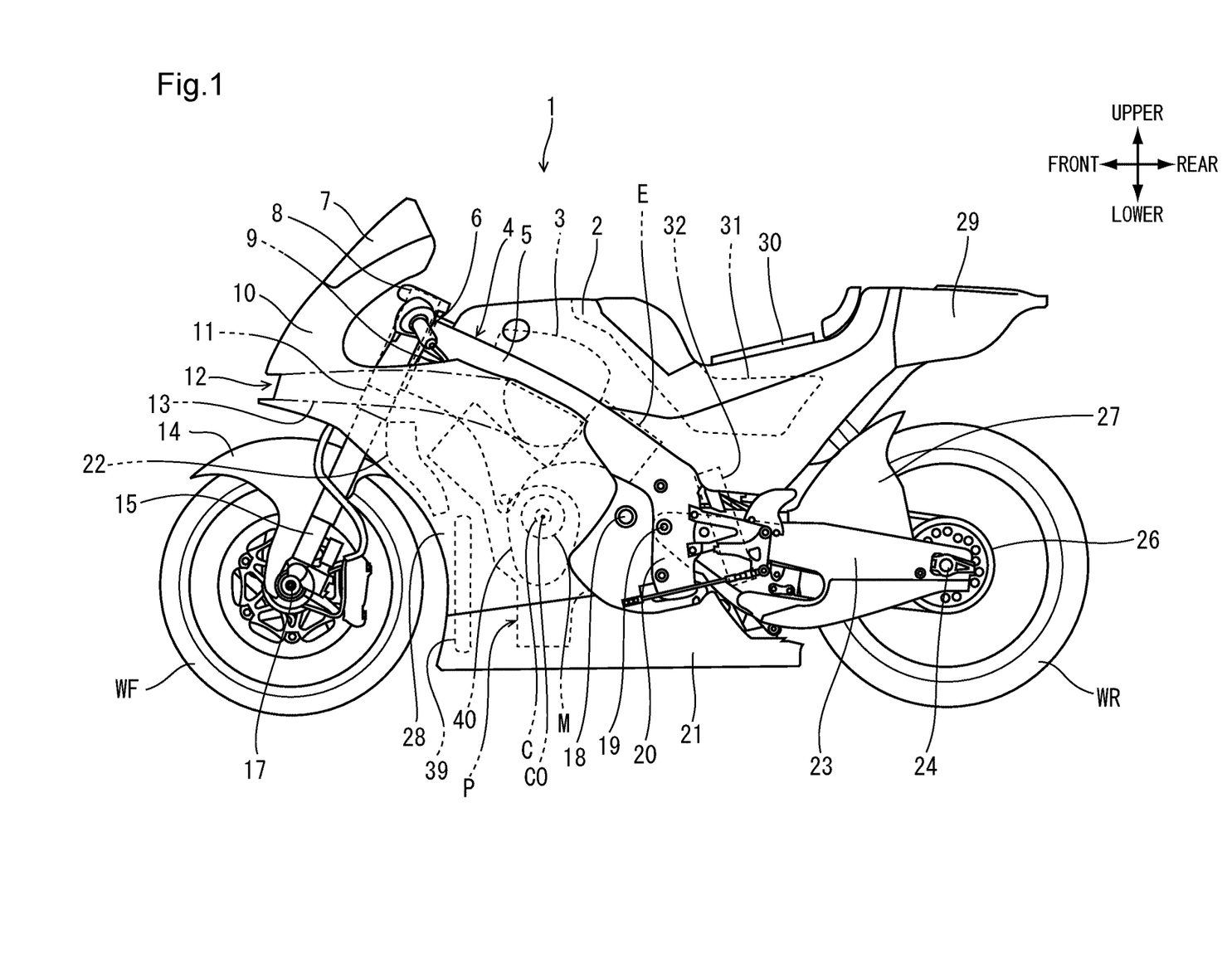
FIG. 1 is a left side view of a motorcycle to which an electric motor cooling structure according to an embodiment of the present invention has been applied.

A preferred embodiment of the present invention will be described in detail below, referring to the drawings. FIG. 1 is a left side view of a motorcycle to which an electric motor cooling structure according to an embodiment of the present invention has been applied. A body frame 4 of the motorcycle 1 as a saddled vehicle has a pair of left and right main frames 5 extending rearwardly downward from a head pipe 9. A steering system for a front wheel WF swingably shaft-supported on the head pipe 9 includes: a pair of left and right front forks 15 that shaft-supports the front wheel WF by an axle 17; a top bridge 8 and a bottom bridge 11 that clamp the front forks 15 at upper and lower sides of the head pipe 9; and a steering stem (not illustrated) that connects the top bridge 8 and the bottom bridge 11 to each other and is shaft-supported by the head pipe 9. A steering handlebar 6 is fixed to upper portions of the front forks 15.

A pair of left and right pivot frames 20 that support a pivot 19 shaft-supporting a swing arm 23 in a swingable manner are connected to rear end portions of the main frames 5. A power unit P having a V-type four-cylinder engine E and a transmission in a united form is fixed on a lower side of the main frames 5 and on the front side of the pivot frames 20. An exhaust gas of the engine E is led to a muffler on a vehicle width-directionally right side through an exhaust pipe. A driving force of the engine E is transmitted to a rear wheel WR, rotatably shaft-supported at a rear end of the swing arm 23 by an axle 24, through an endless drive chain 26 wrapped around a drive sprocket 18 fixed to an output shaft.

A front cowl 10 including a windscreen 7 is disposed on the front side of the head pipe 9. A pair of left and right side cowls 28 covering lateral sides of a vehicle body are connected to a rear portion of the front cowl 10 covering the front side of the vehicle body. An under cowl 21 covering a lower portion of the power unit P is connected to lower end portions of the side cowls 28.

A front fender 14 covering an upper portion of the front wheel WF is fixed to the front forks 15. A tank cover 2 covering a fuel tank 31 and an upper portion of an air cleaner box 3 is attached to upper portions of the main frames 5. A rear cowl 29 is disposed on the rear side of a seat 30 attached to the tank cover 2, and a rear fender 27 covering an upper portion of the rear wheel WR is fixed to an upper portion of the swing arm 23.

The swing arm 23 is suspended from the body frame 4 by a rear cushion 32 disposed on the rear side of the pivot 19. A pair of left and right air ducts 13 that guide outside air to a lower portion of the air cleaner box 3 are disposed on vehicle width-directionally outer sides of the main frames 5. The air ducts 13 pass on the vehicle width-directionally outer sides of the front forks 15, join each other on the front side of the head pipe 9, and are connected to an intake opening 12 provided at the vehicle width-directional center of the front cowl 10. A radiator 22 is disposed on the front side of the engine E, and an oil cooler 39 elongate in the longitudinal vehicle direction is disposed on a lower side of the radiator 22 which is elongate in the vehicle width direction.

A generator M as a motor driven by rotational power of a crankshaft C is accommodated on the vehicle width-directionally left side of the V-type four-cylinder engine E. A rotational axis CO of the generator M coincides with a rotational axis center of the crankshaft C oriented in the vehicle width direction. A vehicle width-directionally outer side of the generator M is covered by a cover member 40 attached to a crankcase.

Figure 2:
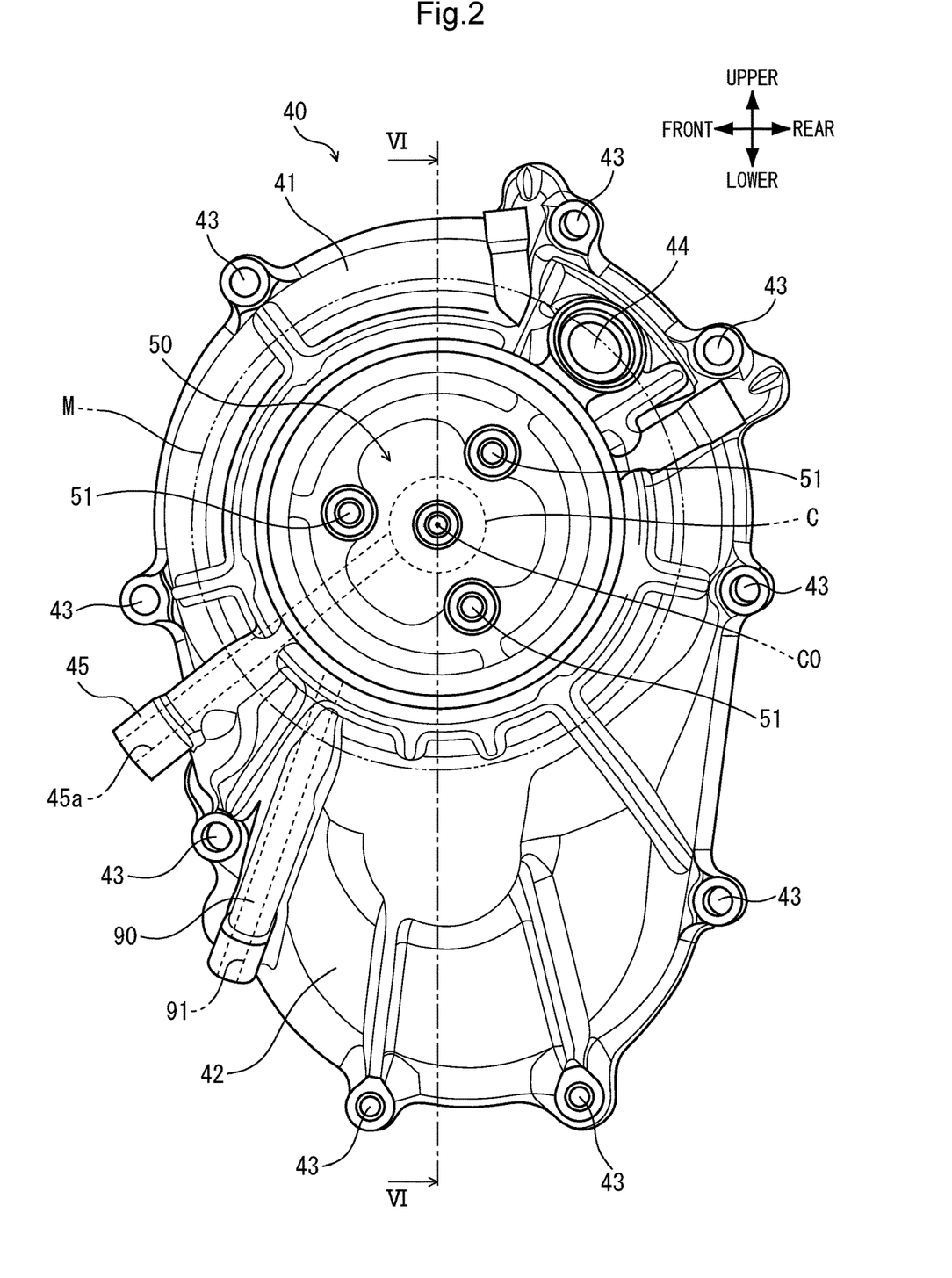
FIG. 2 is a front view of the cover member.
Figure 3:
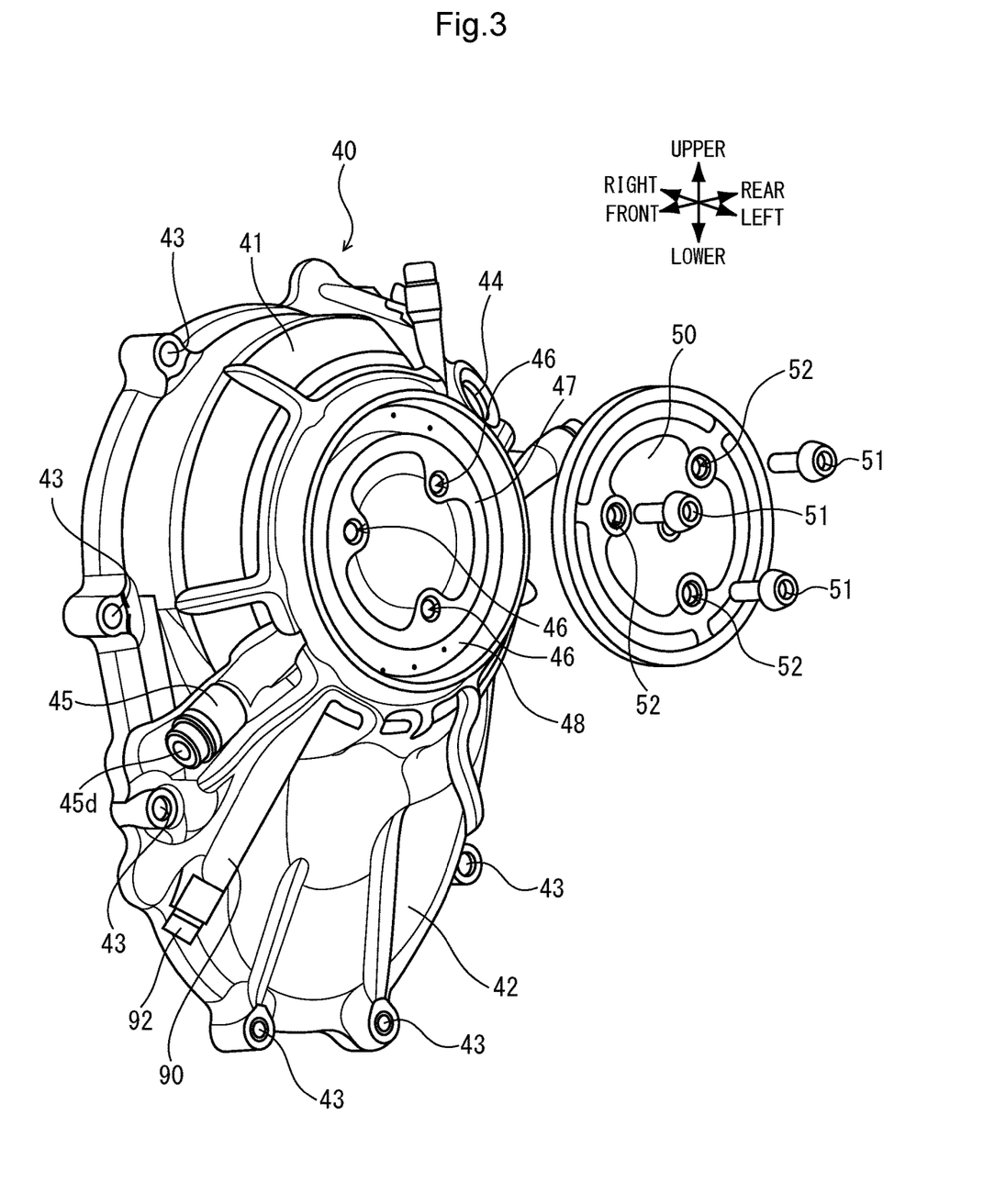
FIG. 3 is a perspective view of the cover member as viewed from a vehicle body front side.

FIG. 2 is a front view of the cover member 40. In addition, FIG. 3 is a perspective view of the cover member 40 as viewed from a vehicle body front side. The cover member 40 covering the vehicle width-directionally left side of the generator M of an outer rotor type is fixed to the crankcase of the engine E by fastening members such as bolts penetrating a plurality of flange sections 43. A main body section 41 of the cover member 40 is an integrally formed part of a metal such as aluminum and magnesium. The substantially circular main body section 41 covering the generator M is formed at a position near an upper portion with a harness take-out port 44 through which a harness (not illustrated) connected to the generator M is passed, and an extension section 42 is connected to the lower side of the main body section 41.

A circular lid member 50 coaxial with the crankshaft C rotated synchronously with the rotational axis of the generator M is provided substantially at the center of the main body section 41. The lid member 50 is fixed to the cover member 40 by fastening members 51 such as bolts. A first oil passage 91 and a second oil passage 45a that guide an oil sent under pressure by an oil pump in the crankcase in the direction of the center of the cover member 40 are formed at positions near a front lower portion of the cover member 40.

The first oil passage 91 communicates with an oil passage for cooling the generator M by jetting the oil to the generator M, and the second oil passage 45a is provided for lubrication by supplying the oil to the periphery of the crankshaft C. The oil passages 91 and 45a each include a combination of a hole extending rectilinearly toward a vehicle with-directionally outer side with a hole extending rectilinearly toward a vehicle width-directionally inner side. Raised sections 90 and 45 for securing material thickness in the peripheries of the oil passages are formed on the outside of the first oil passage 91 and the second oil passage 45, and blocking plugs 45d and 92 (see FIG. 3) are attached to end portions of the first oil passage 91 and the second oil passage 45a.

In this way, the cover member 40 is formed independently with the first oil passage 91 for cooling the generator M and with the second oil passage 45a for supplying the oil to the crankshaft C, whereby the oil can be supplied to the respective oil passages at a stable pressure.

Referring to FIG. 3, the lid member 50 is fixed to a circular base 47 formed in the cover member 40 by use of three fastening members 51 passing through through-holes 52. The circular base 47 is formed with three female screw holes 46 with which the fastening members 51 are screw engaged. An annular groove is formed on the outside of the circular base 47, and, with the lid member 50 attached, an annular oil passage 48 is formed. With the oil passage 48 thus provided between the cover member 40 and the lid member 50, the oil passage 48 can be formed with a simple structure. The oil passage 48 is supplied with the oil through the first oil passage 91.

Figure 4:
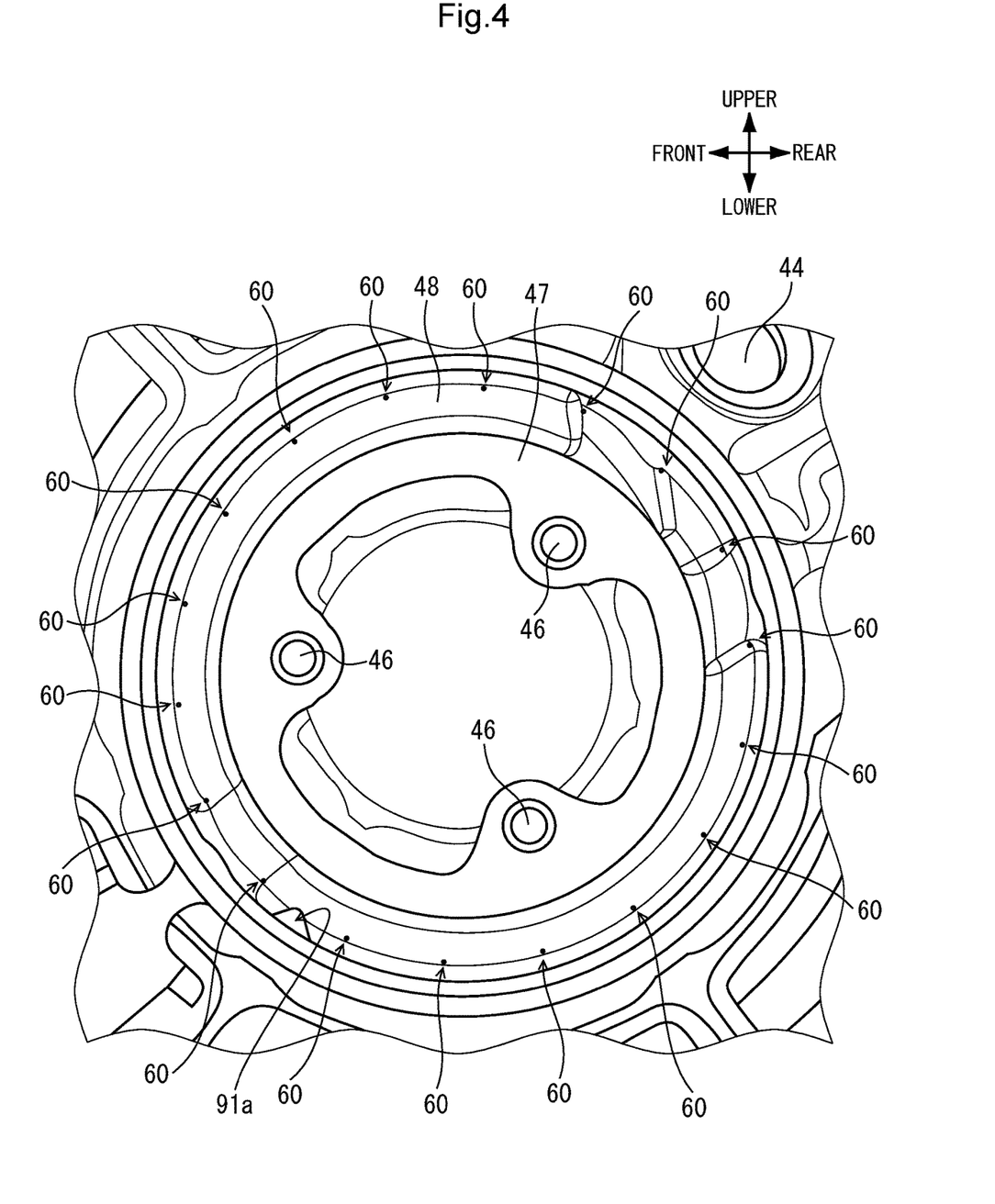
FIG. 4 is an enlarged front view of the cover member in a state in which the lid member is detached.

FIG. 4 is an enlarged front view of the cover member 40 in a state in which the lid member 50 is detached. A bottom portion of the annular groove constituting the oil passage 48 by attaching the lid member 50 is formed with a total of eighteen jet holes 60 concentrically and at regular intervals. The annular groove is provided at a position near a lower portion thereof with an opening 91a as an outlet of the first oil passage 91. When the oil sent under pressure from the first oil passage 91 fills the annular oil passage 48, the oil is jetted from the jet holes 60 toward the vehicle width-directionally inner side.

Figure 5:
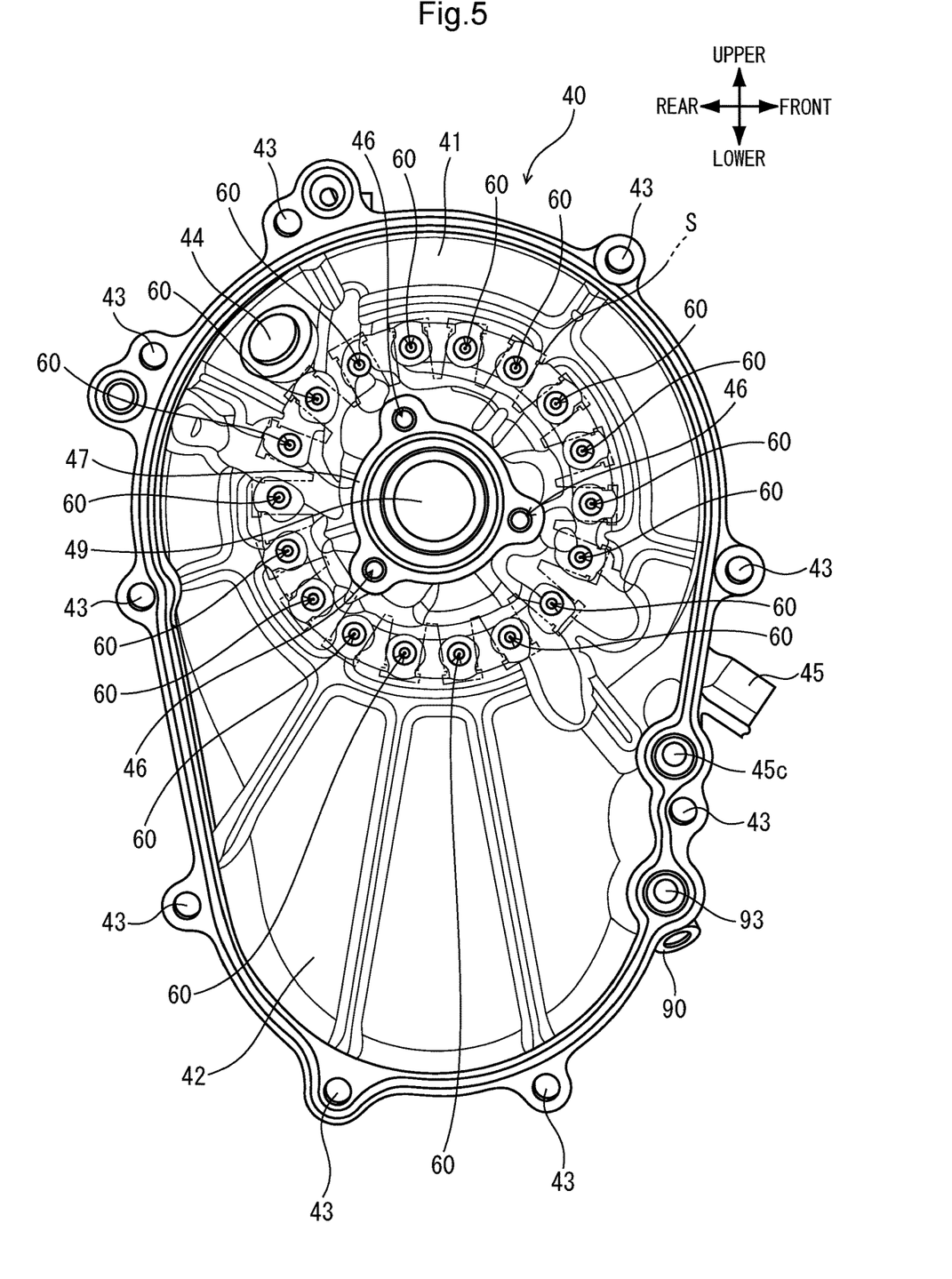
FIG. 5 is a back elevation of the cover member.
Figure 6:
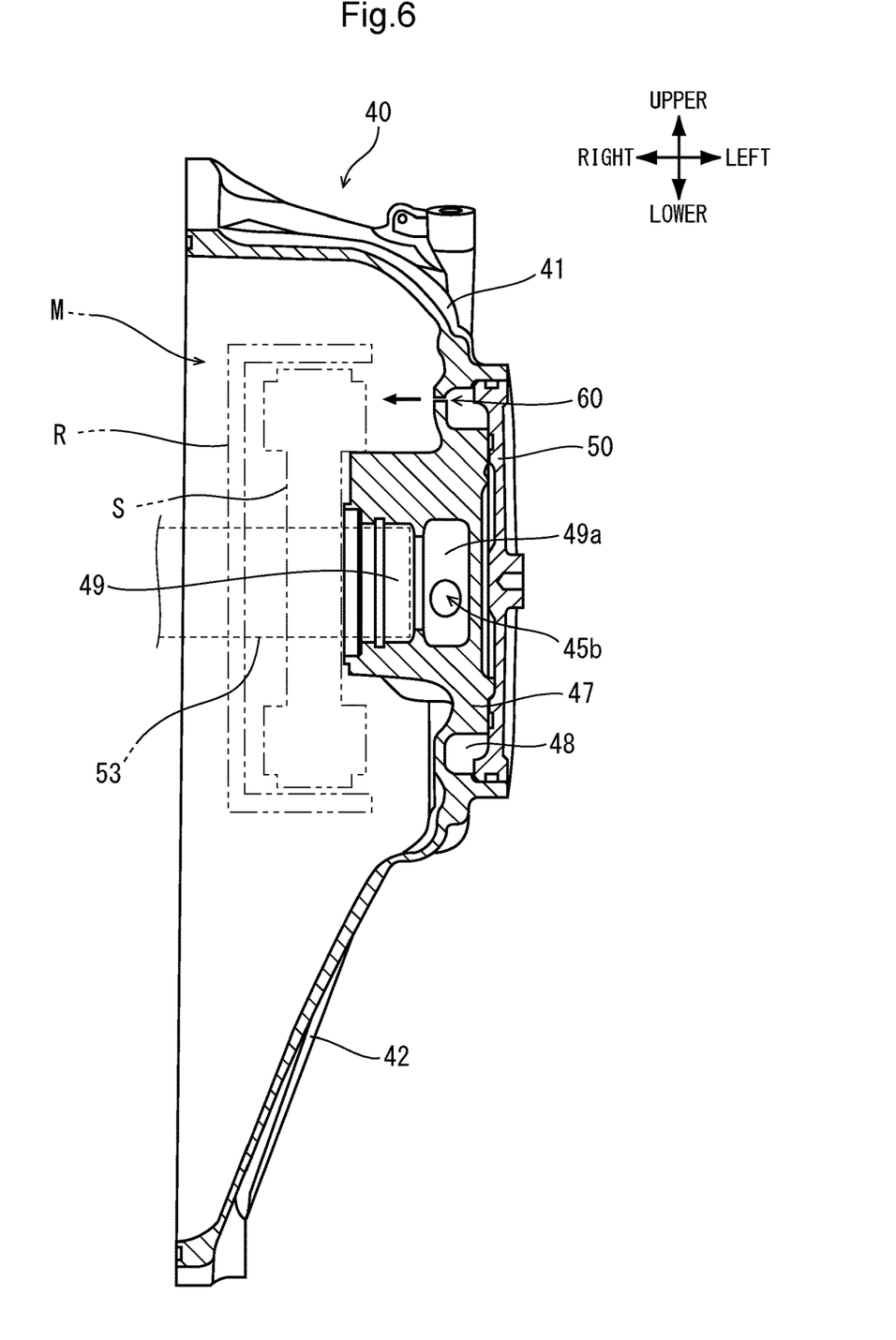
FIG. 6 is a sectional view taken along line VI-VI of FIG. 2.

FIG. 5 is a back elevation of the cover member 40. In addition, FIG. 6 is a sectional view taken along line VI-VI of FIG. 2. The cover member 40 is provided at end portions on a front lower side with a first opening 93 for supplying the oil from the crankcase side to the first oil passage 91, and a second opening 45c for supplying the oil to the second oil passage 45a. The generator M of the outer rotor type includes a rotor R attached to a rotary shaft 53, and a stator S attached to the back surface side of the cover member 40. The jet holes 60 are provided at positions corresponding respectively to a total of eighteen stator coils arranged at regular intervals in the circumferential direction to constitute the stator S, with the stator coils being depicted in depicted in broken lines in FIG. 5. In the present embodiment, the oil passage 48 is formed in an annular shape as viewed in the axial direction of the generator M, and, therefore, the jet holes 60 arranged at regular intervals in an annular pattern can be easily provided.

Referring to FIG. 6, a bottomed shaft hole 49 for supporting the rotary shaft 53 is formed on the back surface side of the circular base 47, and an oil reservoir section 49a in which the oil supplied from the second oil passage 45a is reserved is provided at an end portion on the vehicle width-directionally outer side of the shaft hole 49. The oil supplied from the second oil passage 45a fills up the oil reservoir section 49a and is supplied to the oil passage formed in the inside of the rotary shaft 53, whereby the oil lubricates a plurality for bearings of the crankshaft and the like, and surplus oil is discharged through an outlet hole 45b, to be returned to the crankcase. Note that the rotary shaft 53 may be configured to be integral with or separate from the crankshaft.

Figure 7:
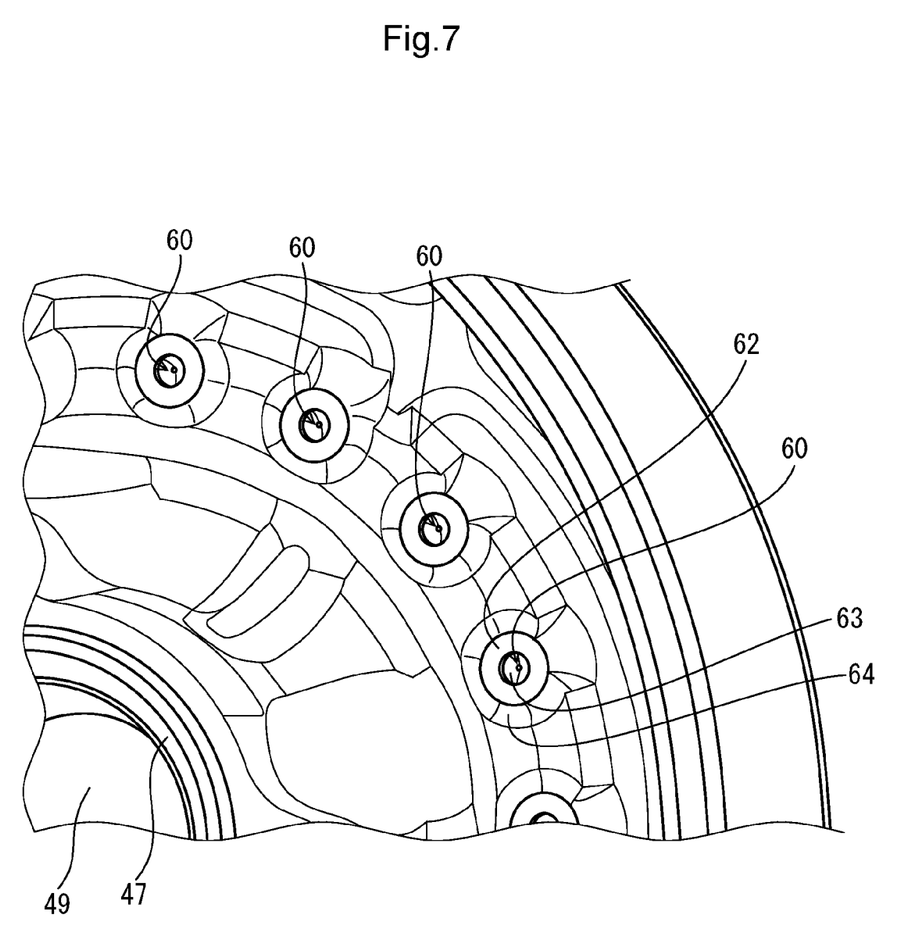
FIG. 7 is an enlarged view of the jet holes.
Figure 8:
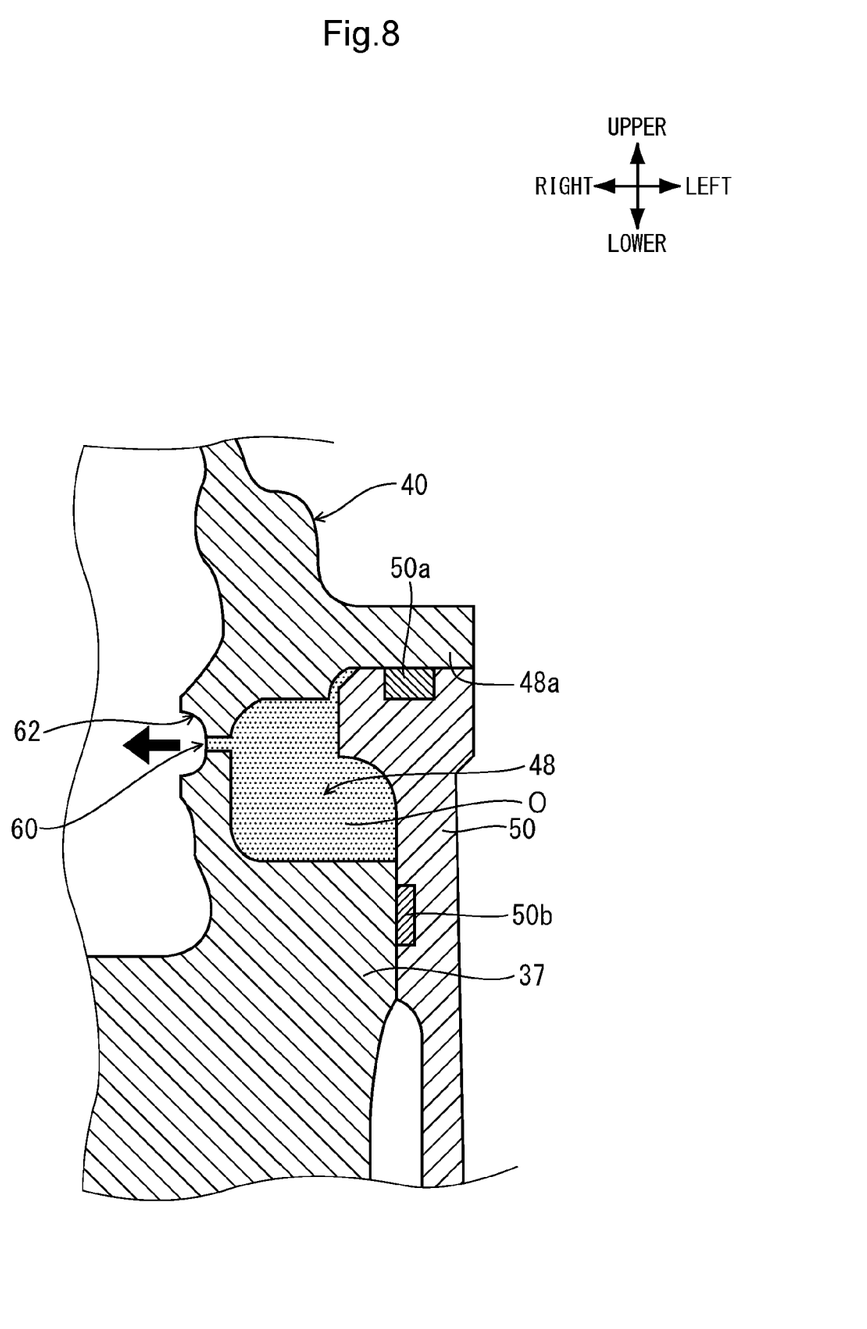
FIG. 8 is a sectional view of the jet hole.

FIG. 7 is an enlarged view of the jet holes 60. In addition, FIG. 8 is a sectional view of the jet hole 60. The jet holes 60 are provided at the centers of projected sections 64 having flat top sections 62 provided on the back surface side of the cover member 40. Specifically, after enlarged-diameter recesses 63 are formed in the center of the projected sections 64 by a large-diameter drill, boring in the centers of the enlarged-diameter recesses 63 by a small-diameter drill is conducted to thereby form the jet holes 60.

In the present embodiment, the jet holes 60 are oriented in the same direction as the axial direction of the generator M. As a result, the operation of forming the jet holes 60 by the drill is facilitated, as compared to the case where, for example, the jet holes are inclined relative to the axial direction of the generator M. Specifically, at the time of forming the cover member 40 with the jet holes 60 by an NC (numerical control) machine or manual operation, the processing can be performed by only changing the boring positions without changing the angle of the drill while keeping the cover member 40 fixed, and, therefore, it is possible to enhance operation efficiency and processing accuracy.

In addition, with the enlarged-diameter recesses 62 concentric with the jet holes 60 formed in a wall section of the cover member 40 on the discharge side of the jet holes 60, the enlarged-diameter recesses 62 are formed by a large-diameter drill, and thereafter the jet holes 60 are formed in bottom portions of the enlarged-diameter recesses 62 by a small-diameter drill. As a result, the thickness required to be penetrated by the small-diameter drill can be reduced, and burden on the small-diameter drill can be reduced.

A large-diameter oil seal 50a fitted to an outer circumferential portion and making contact with an inner circumferential surface 48a of the cover member 40 and a small-diameter oil seal 50b making contact with the circular base 37 at a position near the center as compared to the large-diameter oil seal 50a are engaged with the lid member 50. As a result, with the circular base 37 attached to the lid member 50, the oil seals 50a and 50b function to form the oil passage 48 which is hermetically sealed.

In addition, in the present embodiment, the sectional area of the oil passage 48 is configured to be greater than the total value of the sectional areas of the plurality of jet holes 60. As a result, it is possible to enhance the jetting force of the oil O while maintaining the pressure in the oil passage 48 and to enhance a cooling effect.

Figure 9:
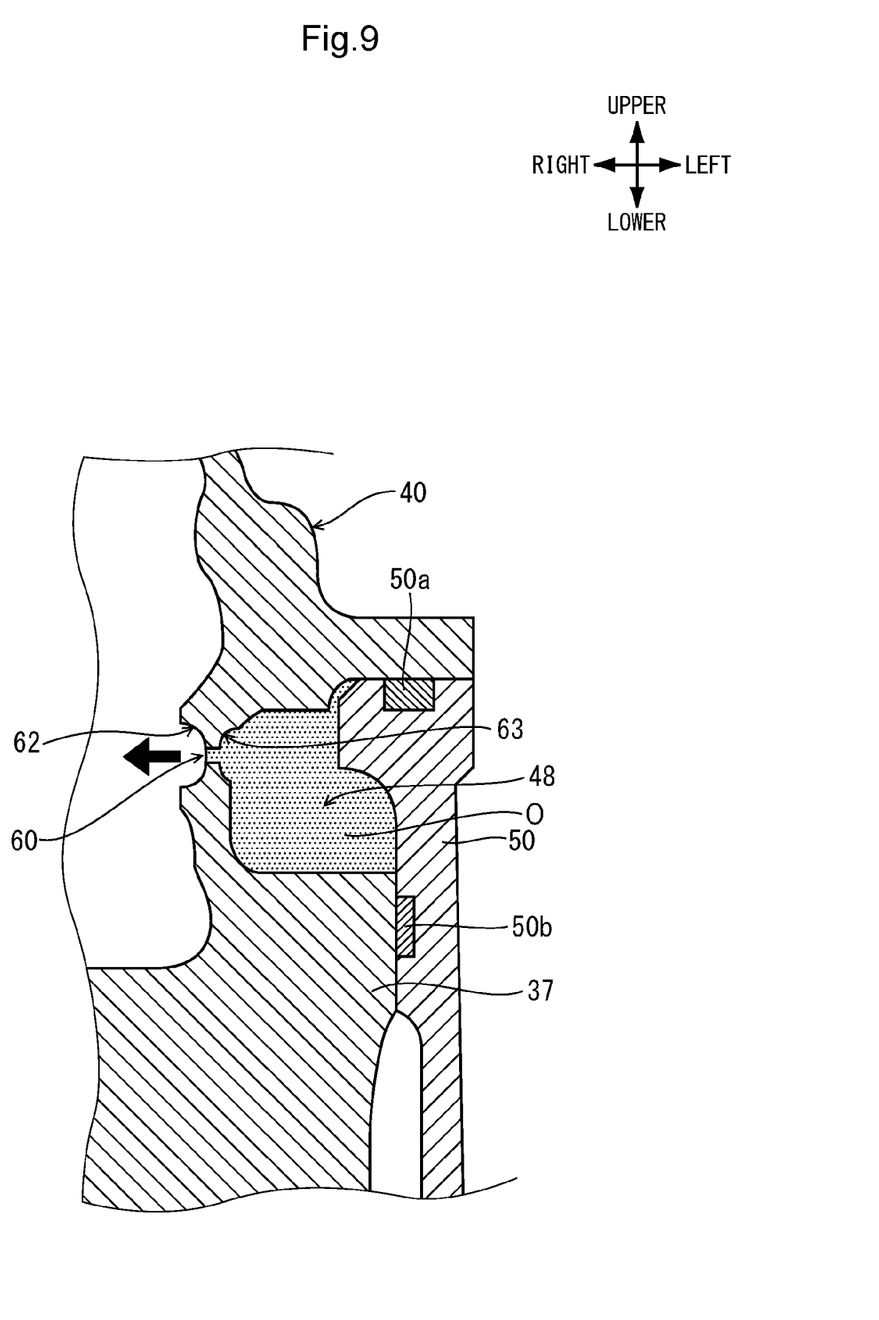
FIG. 9 is a sectional view depicting a modification of the jet hole.

FIG. 9 is a sectional view depicting a modification of the jet hole 60. This modification is characterized in that a second enlarged-diameter recess 63 concentric with the jet hole 60 is formed in a wall section of the cover member 40 on the suction side of the jet hole 60. According to the second enlarged-diameter recess 63, it is possible to more stabilize the supply of the oil to the jet hole 60.

Figure 10:
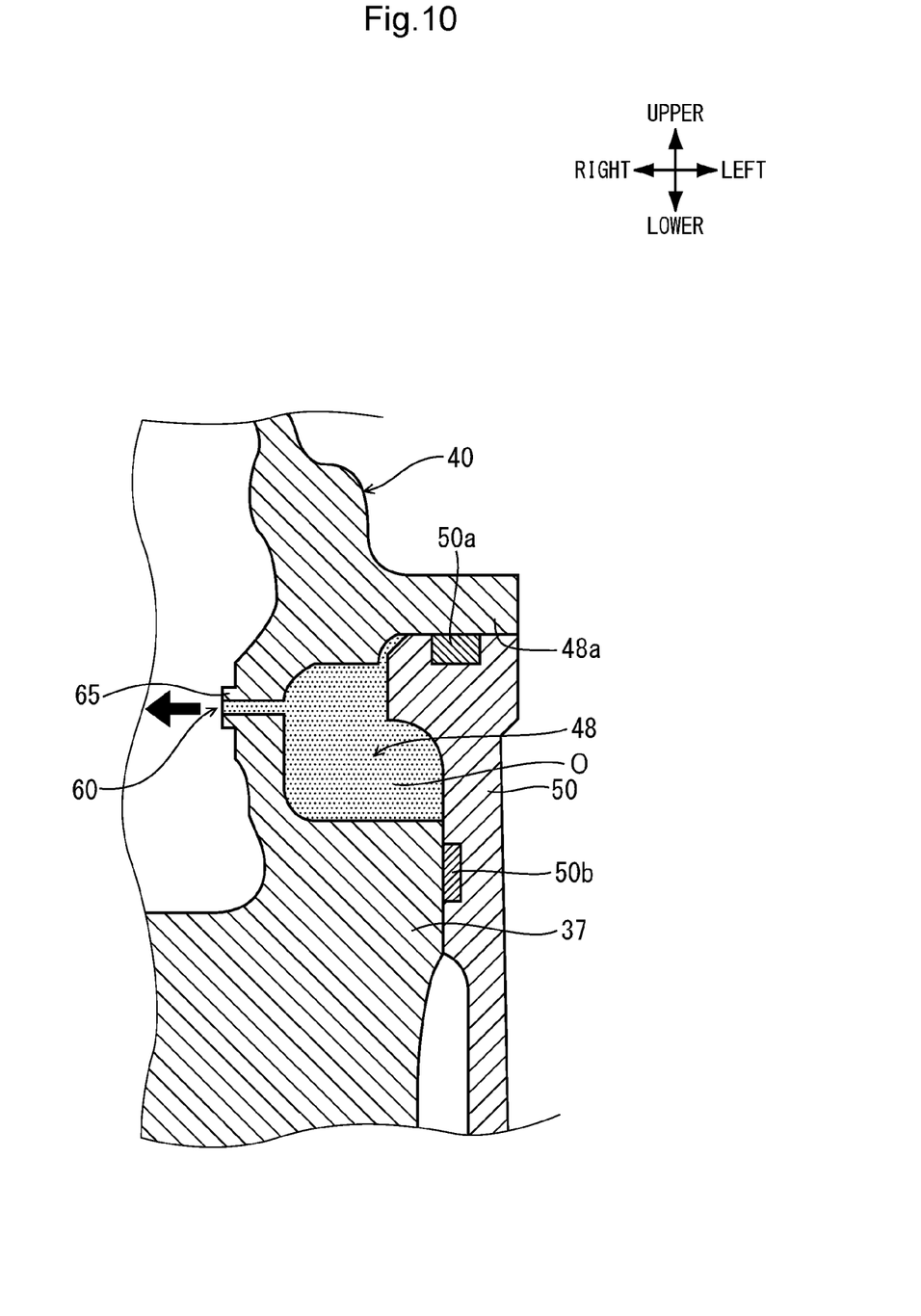
FIG. 10 is a sectional view depicting a second modification of the jet hole.

FIG. 10 is a sectional view depicting a second modification of the jet hole 60. This modification is characterized in that a tubular section 65 concentric with the jet hole 60 is formed in a wall section of the cover member 40 on the jetting side of the jet hole 60. According to the tubular section 65, it is possible to more stabilize the jetting of the oil from the jet hole 60.

Figure 11:
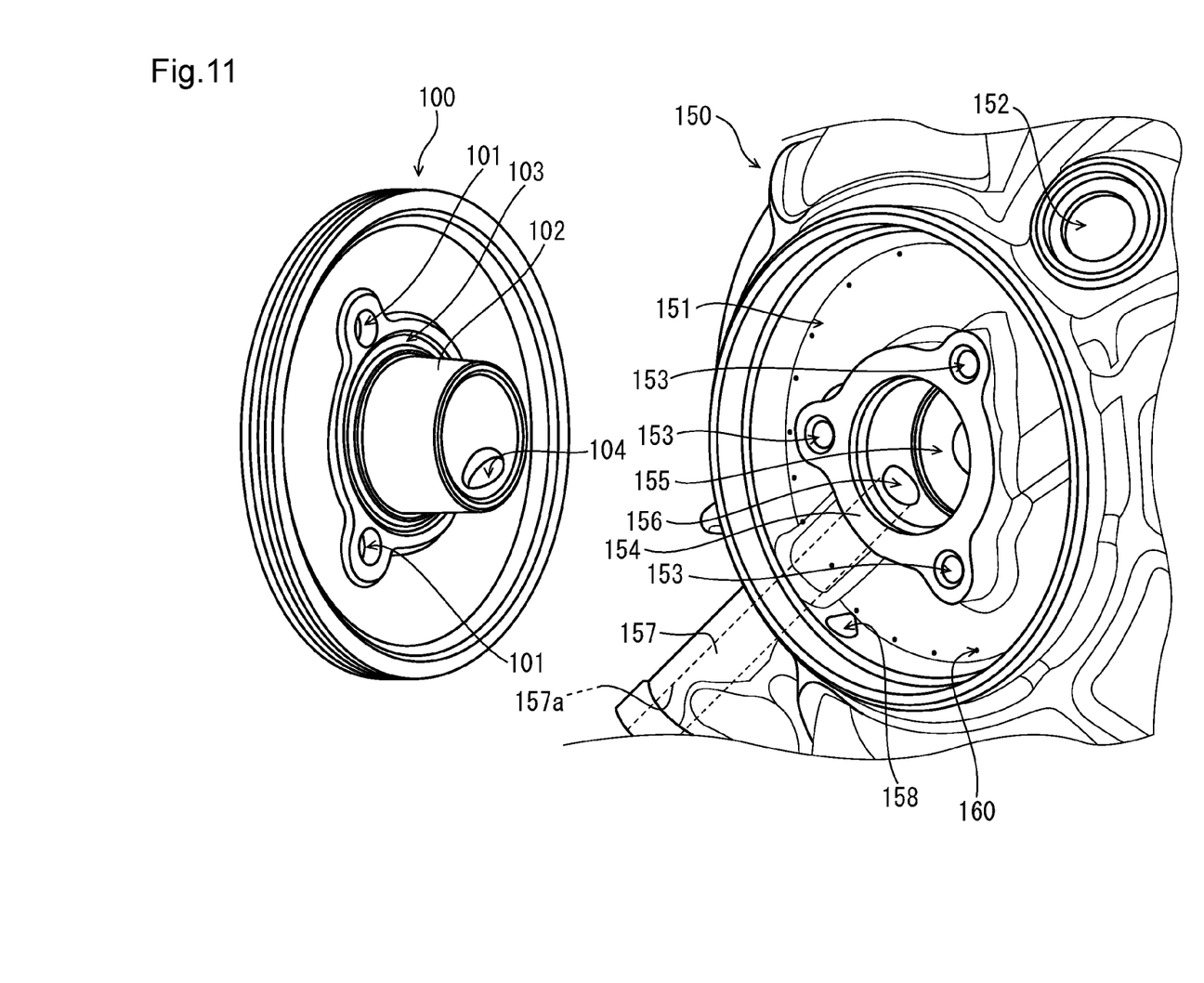
FIG. 11 is a perspective view of a cover member to which an electric motor cooling structure according to a second embodiment of the present invention has been applied.
Figure 12:
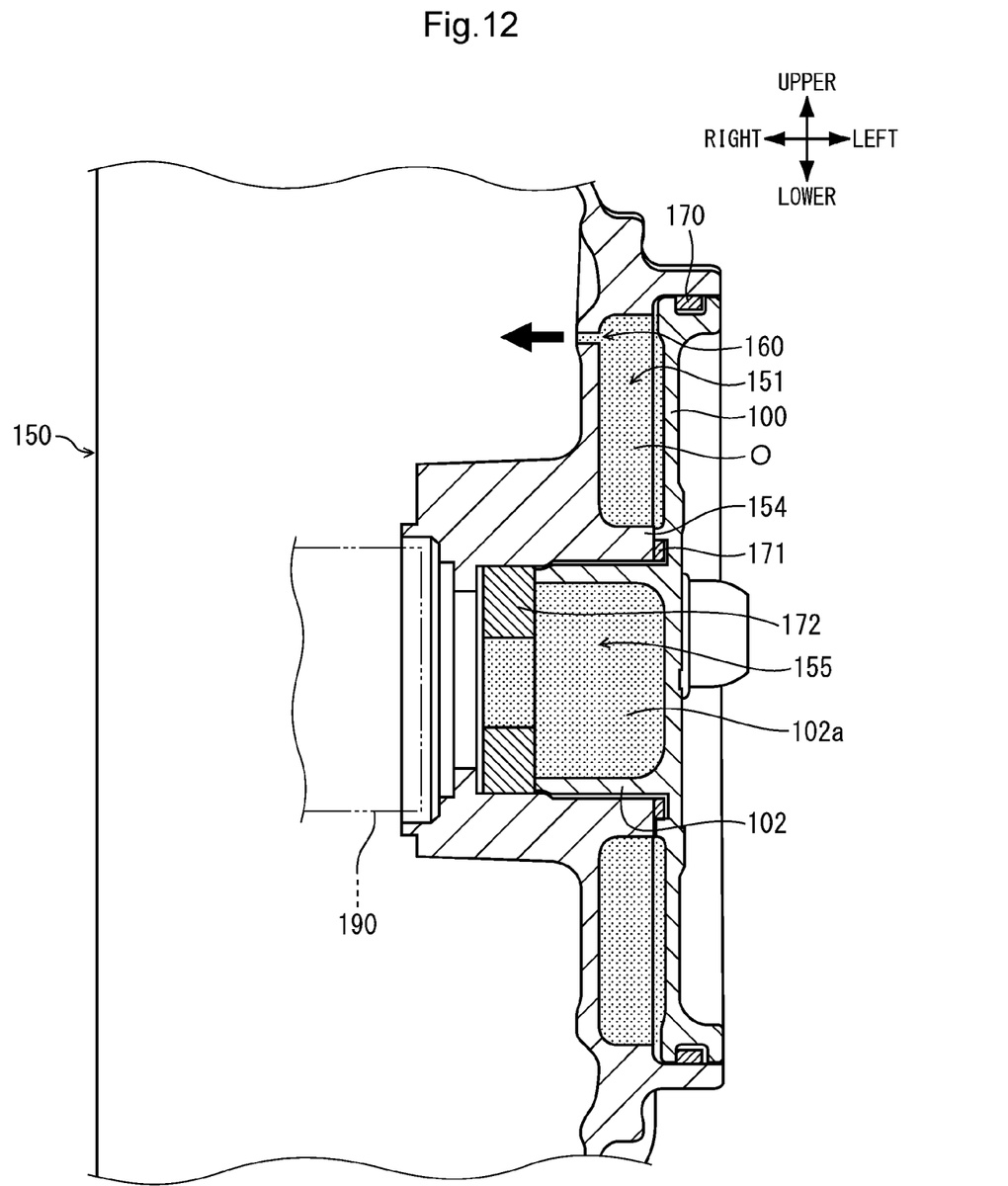
FIG. 12 is a sectional view of the cover member.

FIG. 11 is a perspective view of a cover member 150 to which an electric motor cooling structure according to a second embodiment of the present invention has been applied. In addition, FIG. 12 is a sectional view of the cover member 150. The cover member 150 is attached to the crankcase while covering the outside of the generator M, like the aforementioned cover member 40. The cover member 150 is formed at a position near an upper portion thereof with a harness take-out port 152 through which a harness (not illustrated) connected to the generator M is passed.

In the present embodiment, a through-hole 155 is formed in the center of the cover member 150, and a cylindrical section 102 provided on the back surface side of the lid member 100 is inserted in the through-hole 155. Through-holes 101 through which to pass fastening members are provided in the periphery of the cylindrical section 102 of the lid member 50. A circular base 154 having three female screw holes 153 for attaching the lid member 100 is formed in the periphery of the through-hole 155 formed in the center of the cover member 150. Grooves for configuring the oil passages 151 by attaching the lid member 100 are formed in the periphery of the circular base 154, and a total of eighteen jet holes 160 are formed in bottom portions of the grooves.

A side surface near a lower portion of the groove constituting the oil passage 151 for jetting the oil O (see FIG. 12) to the generator M is provided with a first opening 158 for supplying the oil to the oil passage 151. In addition, an inner circumferential portion of the through-hole 155 is provided with a second opening 156 that communicates with a second oil passage 157a formed in the inside of a raised section 157 and that is for supplying the oil O to a shaft end portion of a rotary shaft 190.

On the other hand, the lid member 100 is formed with an engaging groove for engagement with a large-diameter oil seal 170 (see FIG. 12) making contact with an inner circumferential surface of the cover member 150 on the outside of the oil passage 151, and with an engaging groove 103 for engagement with a small-diameter oil seal 171 making contact with the circular base 37 at a position near the center as compared to the large-diameter oil seal. The cylindrical section 102 of the lid member 100 is formed with a third opening 104 communicating with the second opening 156 when the lid member 100 is attached to the cover member 150.

Referring to FIG. 12, the through-hole 155 is provided with an oil seal 172 making contact with an end portion of the cylindrical section 102; when the lid member 100 is attached to the cover member 150, an oil passage 151 for jetting and supplying the oil O to the generator M is formed between the cover member 150 and the lid member 100, and a space inside the cylindrical section 102 functions as an oil reservoir section 102a for supplying the oil O for lubricating the rotary shaft 190. As shown, the oil passage and an oil reservoir are defined independently of each other between the lid member and the cover member which are attached together.

According to this configuration, with the lid member 100 provided with the cylindrical section 102, it is possible to accurately fix the lid member 100 to the cover member 150. In addition, the oil seal 172 can be pressurized by attaching the lid member 100 to the cover member 150, and the oil reservoir section can be provided without increasing the number of component parts. Further, since the oil passage 151 for cooling the generator M and the oil reservoir section for lubricating the rotary shaft 190 can be disposed such as to overlap with each other in the axial direction, the size in the axial direction of the cover member 150 can be reduced.

The rotary shaft 190 can be configured to be integral with or separate from the crankshaft. In addition, in the present embodiment, also, the inner circumferential surface of the through-hole 155 can be provided with an outlet hole for returning the oil O in the oil reservoir section to the crankcase. In this case, the cylindrical section 102 is provided with an opening which communicates with the outlet hole.

As has been described above, according to the electric motor cooling structure according to the present invention, the oil passage for passing the oil therethrough is formed between the cover member covering the generator from outside and the lid member fitted to the cover member, the cover member is formed with the plurality of jet holes as through-holes communicating with the oil passage, and the plurality of jet holes are oriented in the same direction as the axial direction of the electric motor; therefore, by providing the oil passage between the cover member and the lid member, an oil passage can be formed with a simple structure. In addition, since the jet holes are oriented in the same direction as the axial direction of the electric motor, the operation of forming the jet holes by a drill is facilitated, as compared to the case where the jet holes are inclined relative to the axial direction of the electric motor.

Note that the form of the motorcycle, the shapes and structures of the electric motor and the cover member, the number of the stator coils of the stator, the shapes of the oil passages and the lid member, the number and size of the jet holes, and the like are not limited to those in the above-described embodiment, and various modifications are possible. For example, the oil passage for cooling the stator is not limited to the annular shape as viewed in the axial direction, but may be, for example, a C shape not communicating at a part thereof. The electric motor cooling structure according to the present invention is not limited to application to a motorcycle but is applicable to a power unit mounted on any of various vehicles including motor driven vehicles.

EXPLANATION OF NUMERALS

1 . . . motorcycle
40 . . . cover member
45a . . . second oil passage
48 . . . oil passage
50 . . . lib member
53 . . . rotary shaft
60 . . . jet holes
62 . . . enlarged-diameter recesses
63 . . . second enlarged-diameter recesses
P . . . power unit
M . . . electric motor
100 . . . lid member
102 . . . cylindrical section
104 . . . third opening
150 . . . cover member
151 . . . oil passage
160 . . . jet holes
190 . . . rotary shaft
156 . . . second passage
172 . . . oil seals

The invention claimed is:

1. An electric motor cooling structure for cooling an electric motor provided in a power unit by jetting an oil to the electric motor, wherein
an oil passage for passing the oil is defined between a cover member covering the electric motor from outside and a lid member fitted to the cover member,
the oil passage is annular in shape and is formed by attaching the lid, which is circular in side view of the power unit, to the cover member from outside in a width direction of the power unit,
the cover member is formed with a plurality of jet holes as through-holes communicating with the oil passage,
the plurality of jet holes are provided at positions correspondingly respectively to all the stator coils constituting the stator, the stator being attached to the back surface side of the cover member, and the jet holes are oriented in a same direction as an axial direction of the electric motor, and
the oil passage and a second oil passage are provided independently in the cover member, the second oil passage supplies the oil to an oil reservoir section, wherein the oil reservoir section is formed at an end of a rotary shaft of the electric motor.

2. The electric motor cooling structure according to claim 1, wherein the oil passage is formed in an annular shape as viewed in the axial direction of the electric motor.

3. The electric motor cooling structure according to claim 1, wherein a wall section of the cover member on a discharge side of the jet holes is formed with enlarged-diameter recesses concentric with the jet holes.

4. The electric motor cooling structure according to claim 2, wherein a wall section of the cover member on a discharge side of the jet holes is formed with enlarged-diameter recesses concentric with the jet holes.

5. The electric motor cooling structure according to claim 3, wherein a wall section of the cover member on a suction side of the jet holes is formed with second enlarged-diameter recesses concentric with the jet holes.

6. The electric motor cooling structure according to claim 4, wherein a wall section of the cover member on a suction side of the jet holes is formed with second enlarged-diameter recesses concentric with the jet holes.

7. The electric motor cooling structure according to claim 1, wherein a sectional area of the oil passage is greater than a total value of sectional areas of the plurality of jet holes.

8. The electric motor cooling structure according to claim 2, wherein a sectional area of the oil passage is greater than a total value of sectional areas of the plurality of jet holes.

9. The electric motor cooling structure according to claim 3, wherein a sectional area of the oil passage is greater than a total value of sectional areas of the plurality of jet holes.

10. The electric motor cooling structure according to claim 4, wherein a sectional area of the oil passage is greater than a total value of sectional areas of the plurality of jet holes.

11. The electric motor cooling structure according to claim 1, wherein the oil passage and an oil reservoir are defined independently of each other between the lid member and the cover member.

12. An electric oil cooling structure for cooling an electric motor provided in a power unit by jetting an oil to the electric motor, wherein
an oil passage for passing the oil is defined between a cover member covering the electric motor from outside and a lid member fitted to the cover member,
the oil passage is annular in shape and is formed by attaching the lid member, which is circular in side view of the power unit, to the cover member from outside in a width direction of the power unit,
the cover member is formed with a plurality of jet holes as through-holes communicating with the oil passage,
the plurality of jet holes are oriented in a same direction as an axial direction of the electric motor,
the cover member is formed with a second oil passage for supplying the oil to one end side of a rotary shaft of the electric motor, wherein the second oil passage is functionally independent of the oil passage,
the lid member is formed with a cylindrical section extending toward one end portion of the rotary shaft,
a side wall of the cylindrical section is formed with an opening for communicating with the second oil passage,
an oil seal is disposed between the cylindrical section and the one end portion of the rotary shaft, and a space inside the cylindrical section functions as an oil reservoir section for supplying the oil to the rotary shaft.

13. An electric motor cooling structure for cooling an electric motor provided in a power unit by jetting an oil to the electric motor, wherein an oil passage for passing the oil is defined between a cover member covering the electric motor from outside and a lid member fitted to the cover member, the oil passage is annular in shape and is formed by attaching the lid member, which is circular in side view of the power unit, to the cover member from outside in a width direction of the power unit, the cover member is formed with a plurality of jet holes as through-holes communicating with the oil passage, and the plurality of jet holes are oriented in a same direction as an axial direction of the electric motor, and a second oil passage for supplying the oil to a rotary shaft of the electric motor, wherein the second oil passage is functionally independent of the oil passage.

\* \* \* \* \*